(12) United States Patent
Kubo et al.

(10) Patent No.: US 10,326,134 B2
(45) Date of Patent: Jun. 18, 2019

(54) POSITIVE-ELECTRODE ACTIVE MATERIAL FOR LITHIUM-ION SECONDARY BATTERY, POSITIVE ELECTRODE AND LITHIUM-ION SECONDARY BATTERY

(71) Applicants: SUMITOMO RUBBER INDUSTRIES, LTD., Kobe-shi, Hyogo (JP); NATIONAL INSTITUTE OF ADVANCED INDUSTRIAL SCIENCE AND TECHNOLOGY, Tokyo (JP)

(72) Inventors: Tatsuya Kubo, Kobe (JP); Akihiro Yamano, Ikeda (JP); Naoto Yamashita, Ikeda (JP); Masahiro Yanagida, Ikeda (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 151 days.

(21) Appl. No.: 15/450,961

(22) Filed: Mar. 6, 2017

(65) Prior Publication Data
US 2017/0288225 A1    Oct. 5, 2017

(30) Foreign Application Priority Data

Apr. 5, 2016 (JP) ................................ 2016-076142

(51) Int. Cl.
*H01M 4/58* (2010.01)
*C01B 17/20* (2006.01)
(Continued)

(52) U.S. Cl.
CPC ........... *H01M 4/5815* (2013.01); *C01B 17/20* (2013.01); *C01B 17/22* (2013.01); *C01B 17/42* (2013.01);
(Continued)

(58) Field of Classification Search
CPC ............ H01M 4/5815; H01M 4/0471; H01M 4/1397; H01M 4/362; H01M 4/625;
(Continued)

(56) References Cited

U.S. PATENT DOCUMENTS 10,084,182 B2 * 9/2018 Pan ...................... H01M 4/364
2001/0033971 A1 10/2001 Zhao et al.
(Continued)

FOREIGN PATENT DOCUMENTS

JP    2002-154815 A    5/2002
JP    2012-150933 A    8/2012
(Continued)

OTHER PUBLICATIONS

Extended European Search Report for corresponding European Application No. 17159969.9, dated May 26, 2017.
(Continued)

*Primary Examiner* — Amanda C. Walke
(74) *Attorney, Agent, or Firm* — Birch, Stewart, Kolasch & Birch, LLP

(57) ABSTRACT

An object of the present invention is to provide a novel sulfur-based positive electrode active material for a lithium-ion secondary battery which is excellent in cyclability and can largely improve a charging and discharging capacity, a positive electrode comprising the positive electrode active material and a lithium-ion secondary battery made using the positive electrode. The sulfur-based positive electrode active material is obtainable by subjecting a starting material comprising a polymer, sulfur and an organometallic compound dispersed in a form of fine particles to heat-treatment under a non-oxidizing atmosphere, wherein the particles of metallic sulfide resulting from sulfurization of the organometallic compound are dispersed in the heat-treated mate-
(Continued)

rial, and particle size of the metallic sulfide particles is not less than 10 nm and less than 100 nm.

15 Claims, 3 Drawing Sheets

(51) Int. Cl.
*C01B 17/22* (2006.01)
*C01B 17/42* (2006.01)
*C01B 19/04* (2006.01)
*C01G 9/08* (2006.01)
*C01G 49/12* (2006.01)
*C08J 3/24* (2006.01)
*H01M 4/04* (2006.01)
*H01M 4/62* (2006.01)
*H01M 10/0525* (2010.01)
*H01M 4/1397* (2010.01)
*H01M 4/36* (2006.01)
*H01M 4/02* (2006.01)
*H01M 10/052* (2010.01)

(52) U.S. Cl.
CPC ............... *C01B 19/04* (2013.01); *C01G 9/08* (2013.01); *C01G 49/12* (2013.01); *C08J 3/247* (2013.01); *H01M 4/0471* (2013.01); *H01M 4/1397* (2013.01); *H01M 4/362* (2013.01); *H01M 4/625* (2013.01); *H01M 10/0525* (2013.01); C08J 2309/00 (2013.01); H01M 4/62 (2013.01); H01M 10/052 (2013.01); H01M 2004/021 (2013.01); H01M 2004/028 (2013.01)

(58) Field of Classification Search
CPC .. H01M 4/62; H01M 10/0525; H01M 10/052; C01B 17/20; C01B 17/22; C01B 17/42; C01G 49/12
USPC ...................................................... 429/218.1
See application file for complete search history.

(56) References Cited

U.S. PATENT DOCUMENTS

| 2009/0148703 | A1 | 6/2009 | Goh et al. | |
| 2013/0065128 | A1* | 3/2013 | Li | H01M 10/0525 429/218.1 |
| 2013/0330619 | A1* | 12/2013 | Archer | H01M 4/136 429/213 |
| 2014/0302370 | A1* | 10/2014 | Woodford | H01M 4/382 429/101 |
| 2015/0221935 | A1* | 8/2015 | Zhou | H01M 4/581 429/213 |
| 2016/0164075 | A1* | 6/2016 | Garsuch | H01M 4/364 252/182.1 |
| 2016/0293955 | A1 | 10/2016 | Hochi et al. | |
| 2017/0125794 | A1* | 5/2017 | Zhao | H01M 4/136 |
| 2017/0155129 | A1* | 6/2017 | Fu | H01M 4/622 |

FOREIGN PATENT DOCUMENTS

| JP | 2012-248549 A | 12/2012 |
| WO | WO 2015/050086 A1 | 4/2015 |

OTHER PUBLICATIONS

Fei et al., "Reduced Graphene Oxide Wrapped FeS Nanocomposite for Lithium-Ion Battery Anode with Improved Performance," Applied Materials and Interfaces, vol. 5, No. 11, May 14, 2013, pp. 5330-5335.

Kovalenko et al., "Fatty Acid Salts as Stabilizers in Size- and Shape-Controlled Nanocrystal Synthesis: The Case of Inverse Spinel Iron Oxide," J. Am. Chem. Soc., vol. 129, No. 20, 2007 (published on web May 2, 2007), pp. 6352-6353.

Wu et al., "Iron Sulfide-Embedded Carbon Microsphere Anode Material with High-Rate Performance for Lithium-Ion Batteries," Chem. Commun., vol. 47, No. 30, Jan. 2011, pp. 8653-8655.

Xu et al., "Controlled Soft-Template Synthesis of Ultrathin C@FeS Nanosheets with High-Li-Storage Performance," ACS Nano, vol. 6, No. 6, 2012 (published online May 8, 2012), pp. 4713-4721.

* cited by examiner

POSITIVE-ELECTRODE ACTIVE MATERIAL FOR LITHIUM-ION SECONDARY BATTERY, POSITIVE ELECTRODE AND LITHIUM-ION SECONDARY BATTERY

TECHNICAL FIELD

The present invention relates to a positive-electrode active material for a lithium-ion secondary battery, a positive electrode comprising the positive-electrode active material and a lithium-ion secondary battery comprising the positive electrode.

BACKGROUND OF THE INVENTION

Since a lithium-ion secondary battery, one type of non-aqueous electrolyte secondary batteries, is light in weight and has a large charging and discharging capacity, it has been used mainly as a battery for portable electronic devices. Moreover, practical use of lithium-ion secondary batteries as batteries for motor vehicles such as electric automobiles is expected. Generally, materials comprising a rare metal such as cobalt or nickel are used as a positive-electrode active material of a lithium-ion secondary battery. However, due to the fact that rare metals are small in the distributed amount, not always easily available and additionally expensive, a positive-electrode active material using a material that replaces a rare metal has been desired. Further, in the case of a positive-electrode active material comprising an oxidized compound, oxygen in the positive-electrode active material is released due to overcharging, or the like, and as a result, an organic electrolyte and a current collector are oxidized and burnt, which may cause firing, explosion, and the like.

A technique of using elemental sulfur as a positive-electrode active material is known. Namely, sulfur is easily available compared to rare metals and is inexpensive, and has a further advantage that a charging and discharging capacity of a lithium-ion secondary battery can be made larger than the present state. For example, it is known that a lithium-ion secondary battery using sulfur as a positive-electrode active material can achieve about 6 times larger charging and discharging capacity than a lithium-ion secondary battery using lithium cobalt oxide which is a general positive-electrode material. Further, sulfur is low in reactivity compared to oxygen, and there is a less risk of causing firing, explosion, and the like due to overcharging.

However, the lithium-ion secondary battery using elemental sulfur as the positive-electrode active material has a problem that a battery capacity is deteriorated through repeated charging and discharging. That is, elemental sulfur is likely to generate a compound with lithium when discharging and since the generated compound is soluble into a nonaqueous electrolyte (for example, ethylene carbonate and dimethyl carbonate and the like) of the lithium-ion secondary battery, the charging and discharging capacity is gradually reduced through repeated charging and discharging due to the sulfur eluting into the electrolyte.

Therefore, in order to prevent a sulfur compound from eluting into an electrolyte, a technique of using a given polycarbon sulfide comprising carbon and sulfur as main component elements has been proposed (JP 2002-154815 A). This polycarbon sulfide is prepared by adding sulfur to a linear chain unsaturated polymer. It is understood that this sulfur-based positive-electrode active material can inhibit the charging and discharging capacity of a lithium-ion secondary battery from being reduced through repeated charging and discharging.

Further, it is also understood that a sulfur-based positive-electrode active material obtained by heat-treating a diene rubber and sulfur is useful for enhancing a charging and discharging capacity (WO 2015-050086).

SUMMARY OF THE INVENTION

However, so-called a "cyclability" of a lithium-ion secondary battery could not be improved sufficiently even by the sulfur-based positive-electrode active material presented in JP 2002-154815 A. Here, the "cyclability" means a characteristic of a lithium-ion secondary battery such that a charging and discharging capacity is reduced through repeated charging and discharging. Thus, a lithium-ion secondary battery giving a small decrease in a charging and discharging capacity is a lithium-ion secondary battery being excellent in cyclability, and a lithium-ion secondary battery giving a large decrease in a charging and discharging capacity is a lithium-ion secondary battery being inferior in cyclability.

It can be considered that in JP 2002-154815 A, the reason why the cyclability of the lithium-ion secondary battery is not sufficient is that sulfur and lithium are bonded at the time of discharging, thereby cutting —CS—CS— bonds and —S—S— bonds contained in the polycarbon sulfide and cutting the polymer.

Further, in the lithium-ion secondary battery of WO 2015-050086, its charging and discharging capacity could not be said to be sufficient.

The present inventors have made intensive studies to solve the above-mentioned problem and as a result, have found that a lithium-ion secondary battery having an excellent cyclability and a largely improved charging and discharging capacity can be obtained by using a positive-electrode active material obtained by subjecting a starting material comprising a polymer, sulfur and an organometallic compound dispersed in a form of fine particles to heat-treatment under a non-oxidizing atmosphere, wherein the particles of metallic sulfide resulting from sulfurization of the organometallic compound and having a certain particle size are dispersed in the heat-treated material. The present inventors have made further studies and have completed the present invention.

Namely, the present invention relates to:
[1] a sulfur-based positive-electrode active material, which is obtainable by subjecting a starting material comprising a polymer, sulfur and an organometallic compound dispersed in a form of fine particles to heat-treatment under a non-oxidizing atmosphere, wherein particles of metallic sulfide resulting from sulfurization of the organometallic compound are dispersed in the heat-treated material, and particle size of the metallic sulfide particles is not less than 10 nm and less than 100 nm, preferably from 10 nm to 90 nm,
[2] the sulfur-based positive-electrode active material according to the above [1], wherein the metal comprises at least one selected from the group consisting of Period 4 metals, Period 5 metals, alkali metals and alkali-earth metals,
[3] the sulfur-based positive-electrode active material according to the above [1], wherein the metal comprises at least one selected from the group consisting of Na, Mg, Ti, Cr, Fe, Ni, Cu, Zn, Ru, Nb, Sb and Te,

[4] the sulfur-based positive-electrode active material according to the above [1], wherein the metal comprises at least one selected from the group consisting of Na, Mg, Fe, Zn and Te,

[5] the sulfur-based positive-electrode active material according to any one of the above [1] to [4], wherein a heat-treating temperature is from 250° C. to 550° C., preferably from 300° C. to 450° C.,

[6] the sulfur-based positive-electrode active material according to any one of the above [1] to [5], wherein the polymer is at least one selected from the group consisting of polymers of an unsaturated chain hydrocarbon monomer and condensates of a substituted aromatic hydrocarbon and sulfur chloride,

[7] the sulfur-based positive-electrode active material according to any one of the above [1] to [6], wherein the starting material further comprises a vulcanization accelerator,

[8] the sulfur-based positive-electrode active material according to any one of the above [1] to [7], wherein the starting material further comprises an electrically-conductive carbon material,

[9] the sulfur-based positive-electrode active material according to the above [8], wherein the electrically-conductive carbon material is a carbon material having graphite structure,

[10] the sulfur-based positive-electrode active material according to the above [8] or [9], wherein the starting material comprises 250 to 1500 parts by mass, preferably 300 to 1000 parts by mass of the sulfur, 5 to 50 parts by mass, preferably 7 to 30 parts by mass, more preferably 10 to 30 parts by mass of the organometallic compound, 3 to 250 parts by mass, preferably 10 to 50 parts by mass of the vulcanization accelerator and 5 to 50 parts by mass, preferably 10 to 30 parts by mass of the electrically-conductive carbon material based on 100 parts by mass of the polymer,

[11] the sulfur-based positive-electrode active material according to any one of the above [1] to [10], wherein a total content of the sulfur in the sulfur-based positive-electrode active material is not less than 50% by mass, preferably not less than 51% by mass, more preferably not less than 53% by mass, further preferably not less than 55% by mass,

[12] a positive electrode comprising the sulfur-based positive-electrode active material according to any one of the above [1] to [11],

[13] a lithium-ion secondary battery comprising the positive electrode of the above [12], and

[14] a process for preparing the sulfur-based positive-electrode active material of any one of the above [1] to [11], comprising the following steps (1) and (2):

(1) a step of dispersing the organometallic compound in a form of fine particles into a source material comprising the polymer and the sulfur, and (2) a step of heat-treating a starting material obtained in the step (1) under a non-oxidizing atmosphere.

According to the present invention, it is possible to provide a novel sulfur-based positive-electrode active material for a lithium-ion secondary battery, a positive electrode comprising the positive-electrode active material, and a lithium-ion secondary battery comprising the positive electrode. The thus obtained lithium-ion secondary battery is one having an excellent cyclability and a largely improved charging and discharging capacity.

DETAILED DESCRIPTION

Figure 1:
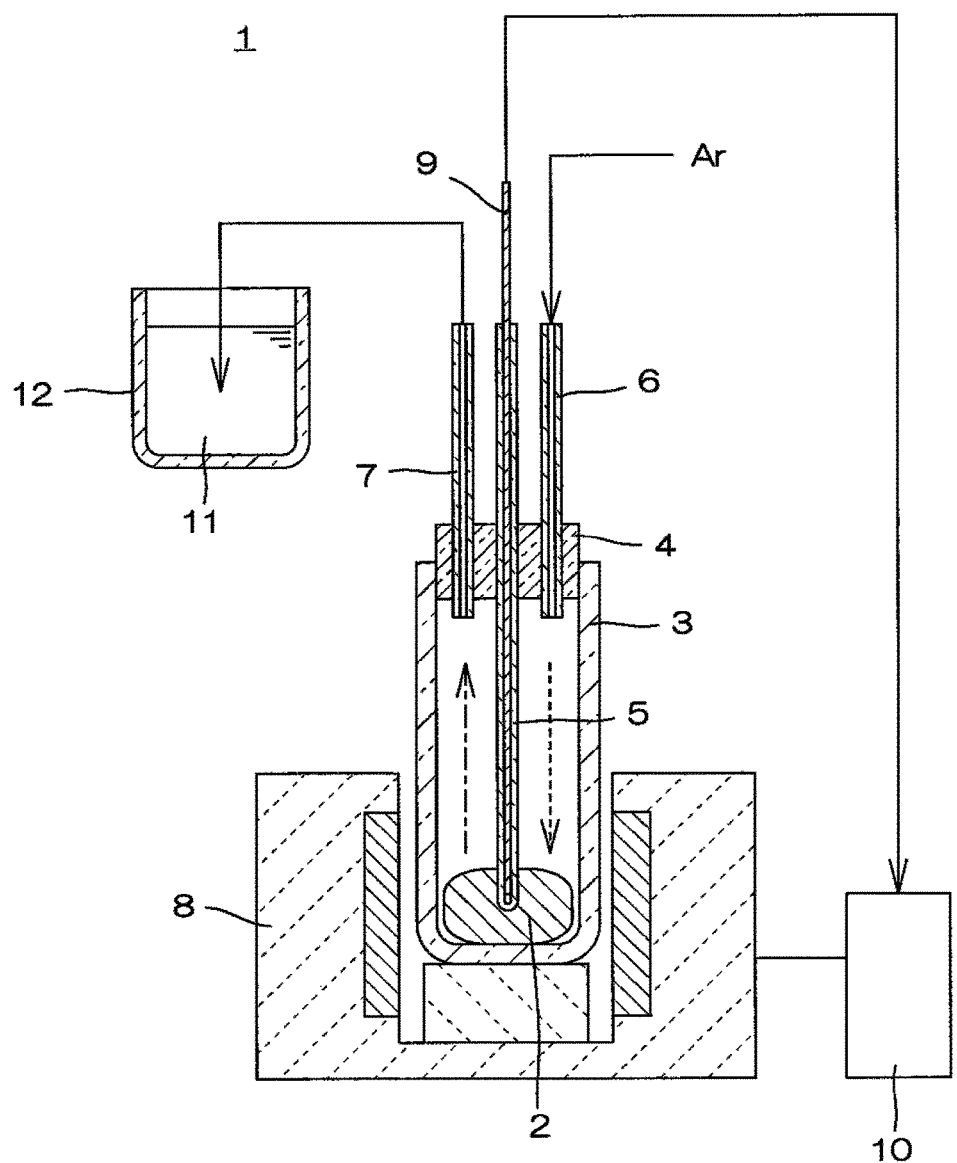
FIG. 1 is a sectional view schematically illustrating a reaction apparatus used for production of a sulfur-based positive-electrode active material in Examples of the present invention.

The sulfur-based positive-electrode active material for the lithium-ion secondary battery, the positive electrode comprising the positive-electrode active material and the lithium-ion secondary battery comprising the positive electrode according to embodiments of the present invention are explained below.

<Positive-Electrode Active Material>

The positive-electrode active material is obtainable by subjecting a starting material comprising a polymer, sulfur and an organometallic compound dispersed in a form of fine particles to heat-treatment under a non-oxidizing atmosphere, wherein the particles of metallic sulfide resulting from sulfurization of the organometallic compound are dispersed in the heat-treated material, and particle size of the metallic sulfide particles is not less than 10 nm and less than 100 nm.

[Polymer]

The polymer is not limited particularly as far as it incorporates the sulfur therein to form a carbon-sulfur structure when heat-treated with sulfur under a non-oxidizing atmosphere. Preferred examples of such a polymer include polymers of an unsaturated chain hydrocarbon monomer and condensates of a substituted aromatic hydrocarbon and sulfur chloride.

Examples of the unsaturated chain hydrocarbon monomer include diene rubbers such as a natural rubber, an isoprene rubber and a butadiene rubber. These diene rubbers are preferred from the viewpoint of availability and low cost. Among these, a natural rubber and a high cis polybutadiene rubber are preferable.

In particular, when a butadiene rubber such as a high cis polybutadiene rubber is used, there is a tendency that the polymer incorporates the sulfur therein and a homogenized structure (thienoacene body) represented by the following formula (1) can be easily obtained. Such a structure is characterized in that in the Raman spectrum, there is a peak around 1940 $cm^{-1}$ of the Raman shift too, and peaks around 1400 $cm^{-1}$ and around 1550 $cm^{-1}$ are very small, as compared with the case of using a natural rubber. Namely it is considered that the thienoacene body in the case of using a natural rubber includes graphite structure in a part of the thienoacene structure, and therefore, a part of the structure can be considered to be inhomogeneous. Meanwhile, it can be considered that the thienoacene body in the case of using a butadiene rubber does not include such graphite structure and its structure is homogeneous. The rubber is provided as a raw material in an unvulcanized state.

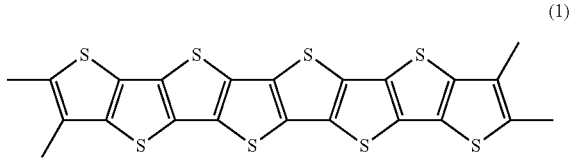

(1)

In the condensates of a substituted aromatic hydrocarbon and sulfur chloride, examples of a substituent group of the substituted aromatic hydrocarbon include hydroxyl, alkyl, and the like. Further, examples of the aromatic hydrocarbon include benzene, naphthalene, anthracene, and the like. Examples of the substituted aromatic hydrocarbon include alkylphenol, and the like. Here, preferred examples of the alkyl include those having 5 to 12 carbon atoms.

Preferred examples of the condensate of a substituted aromatic hydrocarbon and sulfur chloride include alkylphenol-sulfur chloride condensates. The alkylphenol-sulfur chloride condensate is not limited particularly, and for example, a compound represented by the following formula (2) is preferable:

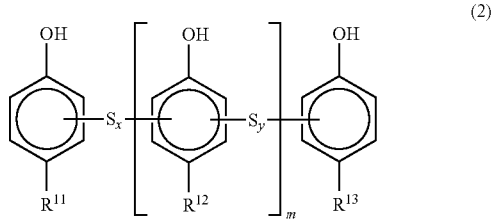

(2)

wherein $R^{11}$, $R^{12}$ and $R^{13}$ are the same or different, and each is an alkyl group having 5 to 12 carbon atoms; x and y are the same or different, and each represents an integer of from 1 to 3; m represents an integer of from 0 to 250.

From the viewpoint of good dispersibility, m is preferably an integer of from 0 to 250, more preferably an integer of from 0 to 100, further preferably an integer of from 10 to 100, particularly preferably an integer of from 20 to 50. From a point that a high hardness is exhibited efficiently, the both of x and y are preferably 2. From the viewpoint of good dispersibility, $R^{11}$, $R^{12}$ and $R^{13}$ are preferably alkyl groups having 6 to 9 carbon atoms.

The above-mentioned alkylphenol-sulfur chloride condensates can be prepared by a known process, for example, a process for reacting the alkylphenol and the sulfur chloride in a molar ratio of 1:0.9 to 1.25.

Examples of the alkylphenol-sulfur chloride condensates include TACKIROL V200 (in the formula (2), $R^{11}$, $R^{12}$ and $R^{13}=C_8H_{17}$, x=2, y=2, m: an integer of from 0 to 100, weight-average molecular weight: 9000), TS3101 (in the formula (2), $R^{11}$, $R^{12}$ and $R^{13}=C_{12}H_{25}$, x=2, y=2, m: an integer of from 150 to 200, weight-average molecular weight: 62000), TS3108 and TS3109 available from Taoka Chemical Co., Ltd., Vultac3 available from Arkema, and the like.

The polymers can be used alone or can be used in combination of two or more thereof.

[Sulfur]

Sulfur in various forms such as powdery sulfur, insoluble sulfur, precipitated sulfur, colloidal sulfur and the like may be used. Among these, precipitated sulfur is preferred.

The compounding ratio of sulfur is preferably not less than 250 parts by mass, more preferably not less than 300 parts by mass based on 100 parts by mass of the polymer. When the compounding ratio is within the above-mentioned range, there is a tendency that a charging and discharging capacity and cyclability are increased. While there is no upper limit of the compounding ratio of sulfur, the compounding ratio is usually not more than 1500 parts by mass, preferably not more than 1000 parts by mass. Even if the ratio exceeds 1500 parts by mass, a charging and discharging capacity or cyclability is hardly improved more, and there is a tendency that the ratio of not more than 1500 parts by mass is advantageous from the viewpoint of cost.

[Organometallic Compound]

The organometallic compound is not limited particularly as far as it can be dispersed in a form of fine particles in the starting material and can be converted to a metallic sulfide by heat-treatment in the presence of sulfur, and any of such organometallic compounds can be used suitably for the purpose of the present invention. It is preferable that the organometallic compound is dispersed uniformly in the starting material. Here, "the form of fine particles" means that the organometallic compound is in a form of fine particles to such an extent that the metallic sulfide obtained by the heat-treatment provides a predetermined particle size explained later.

In the present invention, the metallic sulfide is one converted from the organometallic compound by heat-treatment. Therefore, in the case where an organometallic compound which can be dispersed in the form of fine particles in the starting material is used, the metallic sulfide after the heat-treatment can be obtained in the form of very fine particles (namely particles of not less than 10 nm and less than 100 nm). From this point of view, examples of the organometallic compound which can be suitably used include fatty acid metal salts, metal ionomers of ethylene-(meth)acrylic acid copolymers, metal ionomers of styrene-(meth)acrylic acid copolymers, sandwich compounds, metal salts of dithiocarbamic acid, and the like.

Metals in the organometallic compound may be used alone or may be used in combination of two or more thereof. It is preferable that the metals comprise at least one selected from the group consisting of Period 4 metals, Period 5 metals, alkali metals and alkali-earth metals, more preferably the metals comprise at least one selected from the group consisting of Na, Mg, Ti, Cr, Fe, Ni, Cu, Zn, Ru, Nb, Sb and Te, and further preferably the metals comprise at least one selected from the group consisting of Na, Mg, Fe, Zn and Te.

Regarding the fatty acid metal salt, any of linear chain or branched chain fatty acids and any of saturated and unsaturated fatty acids may be used, and preferred are linear chain and saturated fatty acids. Further, the number of carbon atoms of the fatty acid is preferably from 8 to 20, and in particular stearic acid (Cis) is preferred. Examples of the fatty acid metal salt include zinc stearate, magnesium stearate, zinc octoate, and the like.

Regarding the metal ionomers of ethylene-(meth)acrylic acid copolymers, preferred is one comprising 10 to 30% by mass, preferably 10 to 20% by mass of a component unit derived from the (meth)acrylic acid based on the total components units. Preferred as the ethylene-(meth)acrylic acid copolymer are ethylene-methacrylic acid copolymers. Examples of the metal ionomers of ethylene-(meth)acrylic acid copolymers include sodium ionomers of ethylene-methacrylic acid copolymers (component unit derived from methacrylic acid=15% by mass).

Regarding the metal ionomers of styrene-(meth)acrylic acid copolymers, preferred is one comprising 10 to 30% by mass, preferably 10 to 20% by mass of a component unit derived from the (meth)acrylic acid based on the total components units. Preferred as the styrene-(meth)acrylic acid copolymer are styrene-methacrylic acid copolymers. Examples of the metal ionomers of styrene-(meth)acrylic acid copolymers include sodium ionomers of styrene-methacrylic acid copolymers (component unit derived from methacrylic acid=15% by mass).

The sandwich compounds are compounds obtained by sandwiching a metal atom with two arenes. Examples of the sandwich compounds include bis(cyclopentadienyl) metal complex, bis(benzene) metal complex, bis(cyclooctatetraenyl) metal complex, and the like. Examples of the sandwich compounds include ferrocene(bis(cyclopentadienyl) iron (II)), bis(benzene) chromium, and the like.

The metal salts of dithiocarbamic acid are salts of a dithiocarbamic acid compound and a metal. Here, examples of the dithiocarbamic acid compound include dithiocarbamic acids and compounds obtained by replacing one or two hydrogen atoms on an amino group in a molecule of the dithiocarbamic acid with hydrocarbon groups. The dithiocarbamic acid compound is preferably one in which the both of hydrogen atoms have been replaced with hydrocarbon groups. Further, the two hydrogen atoms may be replaced with different monovalent hydrocarbon groups or may be replaced with one divalent hydrocarbon group.

The hydrocarbon groups may be any of chain, cyclic and mixed type (namely a mixed type having chain and cyclic hydrocarbon groups), and may be either of saturated and unsaturated hydrocarbon groups. In the hydrocarbon, a chain portion may be either of a linear chain and a branched chain, and a cyclic portion may be either of an aromatic ring group and a non-aromatic ring group. The number of carbon atoms of the monovalent hydrocarbon group is preferably from 1 to 10, more preferably from 1 to 8, further preferably from 1 to 7. The number of carbon atoms of the divalent hydrocarbon group is preferably from 3 to 7, more preferably from 4 to 6. Examples of the monovalent hydrocarbon group include methyl, ethyl, butyl (preferably n-butyl), phenyl, benzyl, and the like, and examples of the divalent hydrocarbon group include tetramethylene, and the like. Examples of the dithiocarbamic acid compound include diethyldithiocarbamic acid, dimethyldithiocarbamic acid, dibutyldithiocarbamic acid, dibenzyldithiocarbamic acid, N-pentamethylenedithiocarbamic acid, N-phenyl-N-ethyldithiocarbamic acid, and the like.

Examples of the metal salts of dithiocarbamic acid include iron(III) dimethyldithiocarbamate, copper dimethyldithiocarbamate, zinc dimethyldithiocarbamate, tellurium diethyldithiocarbamate, zinc diethyldithiocarbamate, sodium dibutyldithiocarbamate, zinc dibutyldithiocarbamate, zinc dibenzyldithiocarbamate, zinc N-pentamethylenedithiocarbamate and zinc N-phenyl-N-ethyldithiocarbamate.

The compounding ratio of organometallic compound is preferably not less than 5 parts by mass, more preferably not less than 7 parts by mass, further preferably not less than 10 parts by mass based on 100 parts by mass of the polymer. Meanwhile, the compounding ratio is preferably not more than 50 parts by mass, more preferably not more than 30 parts by mass. When the compounding ratio is within the above-mentioned range, there is a tendency that a charging and discharging capacity and cyclability are increased.

The organometallic compound is, after compounded to the source materials, fully kneaded together with the other materials, and thereby, is uniformly dispersed in the form of fine particles in the starting material. When the thus obtained starting material is heat-treated in the presence of sulfur, the organometallic compound is converted to the metallic sulfide having a predetermined particle size.

The particle size of the metallic sulfide is within a range of not less than 10 nm and less than 100 nm, more preferably within a range of 10 nm to 90 nm. When the particle size is within such a range, there is a tendency that a charging and discharging capacity and cyclability are increased. The particle size of the metallic sulfide can be measured by observing a cross-section of the sulfur-based positive-electrode active material with a transmission electron microscope. Even if a metallic sulfide having a particle size out of the above-mentioned range is contained a little, there is no problem as far as the metallic sulfide having a particle size within the above-mentioned range is contained enough to an extent to exhibit the effect of the present invention. Usually it is considered that when at least 80% by mass of the metallic sulfide has a particle size within the above-mentioned range, the effect of the present invention can be exhibited sufficiently.

The organometallic compounds can be used alone or can be used in combination of two or more thereof.

[Vulcanization Accelerator]

It is preferable that the starting material further comprises a vulcanization accelerator. This is because the vulcanization accelerator can function for enhancing cyclability of a lithium-ion secondary battery.

Examples of the vulcanization accelerator include thiourea-, guanidine-, thiazole-, sulfenamide-, thiuram-, dithiocarbamate- and xanthogenate-based vulcanization accelerators. Among these, examples of thiuram compounds include one or more of tetramethylthiuram disulfide (TT), tetraethylthiuram disulfide (TET), tetrabutylthiuram disulfide (TBT), tetrakis(2-ethylhexyl)thiuram disulfide (TOT-N), tetramethylthiuram monosulfide (TS), dipentamethylenethiuram tetrasulfide (TRA), and the like.

Particularly preferred as the thiuram compound are TT, TET, TBT, TS, and the like, in which any of terminal substituent groups is a linear chain alkyl. Preferred dithiocarbamate compounds are zinc salts thereof. Examples of a zinc salt of a dithiocarbamic acid include zinc diethyldithiocarbamate (EZ), zinc dibutyldithiocarbamate (BZ), zinc dimethyldithiocarbamate (PZ), zinc N-ethyl-N-phenyldithiocarbamate (PX), and the like.

When these compounds are selected and used as a vulcanization accelerator, the sulfur-based positive-electrode active material being excellent in an effect of enhancing not only a charging and discharging capacity but also cyclability of a lithium-ion secondary battery can be prepared.

When the vulcanization accelerator is compounded, the compounding ratio thereof is preferably not less than 3 parts by mass, more preferably not less than 10 parts by mass based on 100 parts by mass of the polymer. On the other hand, the compounding ratio of the vulcanization accelerator is preferably not more than 250 parts by mass, more preferably not more than 50 parts by mass. When the compounding ratio of the vulcanization accelerator is within the above-mentioned range, cyclability of the lithium-ion secondary battery tends to be enhanced.

The vulcanization accelerators may be used alone or may be used in combination of two or more thereof.

[Electrically-Conductive Carbon Material]

It is preferable that the starting material further comprises an electrically-conductive carbon material. This is because by compounding the electrically-conductive carbon material, electric conductivity can be enhanced. Any of various electrically-conductive carbon materials working for enhancing cyclability of the lithium-ion secondary battery can be used as the electrically-conductive carbon material.

Examples of the electrically-conductive carbon material include carbon materials having a fused aromatic ring structure such as carbon black, graphite, carbon nanotube (CNT), carbon fiber (CF), graphene, fullerene and the like. Further, electrically-conductive carbon materials having a nitrogen-containing heterocyclic ring structure can also be used as the electrically-conductive carbon material. Particularly preferred as the electrically-conductive carbon material are carbon materials having a graphite structure, and examples thereof include the above-mentioned carbon materials having a fused aromatic ring structure.

Among them, carbon black is preferable since it is inexpensive and excellent in dispersibility. Also, a small amount of CNT or graphene may be combined with carbon black. In accordance with such combination, cyclability of a lithium-ion secondary battery can be further improved without largely increasing a cost. The combined amount of CNT or graphene is preferably not less than 8% by mass and not more than 12% by mass based on the total amount of electrically-conductive carbon materials.

When compounding the electrically conductive carbon material, the compounding ratio thereof is preferably not less than 5 parts by mass, more preferably not less than 10 parts by mass based on 100 parts by mass of the polymer. On the other hand, the compounding ratio of the electrically conductive carbon material is preferably not more than 50 parts by mass, more preferably not more than 30 parts by mass. When the compounding ratio is within the mentioned range, enhancing cyclability by compounding the electrically conductive carbon material tends to be achieved, while sufficiently enhancing a charging and discharging capacity of the lithium-ion secondary battery.

In addition, it can be considered that the vulcanization accelerator works for enhancing cyclability of the lithium-ion secondary battery by incorporating much amount of sulfur into the rubber as well as preventing cutting of a polymer when discharging. On the other hand, it can be considered that the electrically-conductive carbon material works for enhancing cyclability of the lithium-ion secondary battery by enhancing electric conductivity in the sulfur-based positive-electrode active material, thereby increasing reactivity with the lithium ion.

The electrically-conductive carbon materials may be used alone or may be used in combination of two or more thereof.

[Preparation of Sulfur-Based Positive-Electrode Active Material]

The sulfur-based positive-electrode active material can be prepared by heat-treating the starting material comprising the polymer, the sulfur and the organometallic compound dispersed in the form of fine particles under a non-oxidizing atmosphere. Further, the starting material may further comprise the vulcanization accelerator and the electrically-conductive carbon material as mentioned above. The starting material is mixed sufficiently before being subjected to heat-treatment.

More specifically the process for preparing the sulfur-based positive-electrode active material according to this embodiment is the process for preparing the sulfur-based positive-electrode active material in which the metallic sulfide particles having a particle size of not less than 10 nm and less than 100 nm are dispersed, and the process comprises the following steps (1) and (2).

(1) a step of dispersing the organometallic compound in a form of fine particles into a source material comprising the polymer and the sulfur, and (2) a step of heat-treating a starting material obtained in the step (1) under a non-oxidizing atmosphere.

(Dispersion)

The step of dispersing the organometallic compound in a form of fine particles into a source material comprising the polymer and the sulfur can be executed by kneading the mixture by a usual method prevailing in this field. According to this embodiment, the organometallic compound is first dispersed in the source material before heat-treatment, and then, converted to metallic sulfide by heat-treatment in the presence of sulfur, instead of directly dispersing metallic sulfide. This makes it possible to easily obtain the sulfur-based positive-electrode active material in which the metallic sulfide particles having a particle size of not less than 10 nm and less than 100 nm are dispersed even if the dispersing itself of the organometallic compound is conducted by a usual method. The kneading can be carried out suitably using a usual kneading device (for example, a kneading testing device, MIX-LABO manufactured by Moriyama Company, Ltd.). Usually 10 to 40 minutes is sufficient as a kneading time.

(Heat Treatment)

The reason why the heat treatment is performed by heating under a non-oxidizing atmosphere is that an oxidative deterioration or an excess thermal decomposition of the components can be prevented, and as a result, the sulfur-based positive-electrode active material being excellent in an effect of enhancing a charging and discharging capacity and cyclability of the lithium-ion secondary battery can be formed. Here, the non-oxidizing atmosphere means an atmosphere substantially containing no oxygen. Example of the heating under a non-oxidizing atmosphere includes heat treatment under an inert gas atmosphere in a silica tube filled with an inert gas such as nitrogen or argon.

The temperature of the heat treatment is preferably not less than 250° C., more preferably not less than 300° C. On the other hand, the heat-treating temperature is preferably not more than 550° C., more preferably not more than 450° C. When the heat-treating temperature is within the mentioned range, there is a tendency that decomposition of the starting compound can be prevented while carrying out a sufficient sulfurizing reaction, which is advantageous in achieving a sufficient charging and discharging capacity of the lithium-ion secondary battery.

A period of time for the heat treatment is preferably 2 to 6 hours. When the heat-treating time is within the mentioned range, there is a tendency that the heat treatment can be advanced sufficiently, and that excessive thermal decomposition of the components can be prevented.

The mixing and heat treatment of the starting material can also be carried out by heat-treating while kneading the components of the starting material in a continuous apparatus such as a twin-screw extruder.

(Removal of Un-Reacted Sulfur)

So-called unreacted sulfur which results from deposition by cooling of sulfur sublimated at the heat treatment may remain in the prepared sulfur-based positive-electrode active material. It is desirable to remove such unreacted sulfur since it causes deterioration of cyclability. Examples of a method for removing unreacted sulfur include a removal by heating under a reduced pressure, a removal by warm wind, a removal by washing with a solvent and the like.

(Pulverization, and Classification)

The sulfur-based positive-electrode active material is pulverized so as to be predetermined grain sizes and is classified to be particles suitable for production of a positive electrode. A preferred particle size distribution of the particles is from about 5 to 25 μm in a median size. It is noted that in the above-explained heat treatment method using a twin-screw extruder, the produced sulfur-based positive-electrode active material can also be pulverized at the same time due to shearing at kneading.

(Sulfur-Based Positive-Electrode Active Material)

In the sulfur-based positive-electrode active material prepared through the above-mentioned step, as the total content of sulfur increases, cyclability of the lithium-ion secondary battery tends to be improved. Therefore, the total content of sulfur as large as possible is preferable. The total content of sulfur by an elemental analysis is preferably not less than 50% by mass, more preferably not less than 51% by mass, further preferably not less than 53% by mass, furthermore preferably not less than 55% by mass. Further, it is preferable that the content of hydrogen is not more than 1.6% by mass, particularly not more than 1.0% by mass.

<Positive Electrode for Lithium-Ion Secondary Battery>

By using the above-mentioned sulfur-based positive-electrode active material, the positive electrode for a lithium-ion secondary battery comprising the sulfur-based positive-electrode active material can be produced. For example, the positive electrode for a lithium-ion secondary battery can be produced by applying a positive electrode material prepared by mixing the sulfur-based positive-electrode active material, the electrically-conductive additive, the binder and a solvent to a current collector. Example of another method of producing the positive electrode is a method of kneading a mixture of the sulfur-based positive-electrode active material, the electrically-conductive additive and a binder in a mortar, a press, or the like; molding the kneaded product into a film form; and pressure-bonding the film onto the current collector with a press, or the like.

[Electrically-Conductive Additive]

Examples of an electrically-conductive additive include vapor grown carbon fibers (VGCF), carbon powders, carbon black (CB), acetylene black (AB), KETJENBLACK (KB), graphite, fine powders of metals being stable at positive-electrode potentials, such as aluminum and titanium, and the like.

The electrically-conductive additives may be used alone or may be used in combination of two or more thereof.

[Binder]

Examples of the binder include polyvinylidene difluoride (PVDF), polytetrafluoroethylene (PTFE), styrene-butadiene rubber (SBR), polyimide (PI), polyamide-imide (PAI), carboxymethyl cellulose (CMC), polyvinyl chloride (PVC), methacrylic resins (PMA), polyacrylonitrile (PAN), modified polyphenylene oxide (PPO), polyethylene oxide (PEO), polyethylene (PE), polypropylene (PP) and the like.

The binders may be used alone, or may be used in combination of two or more thereof.

[Solvent]

Examples of the solvent include hexane, N-methyl-2-pyrrolidone, N,N-dimethylformaldehyde, alcohols, water and the like.

The solvents may be used alone, or may be used in combination of two or more thereof.

[Compounding Ratio]

The compounding ratio of each of the electrically-conductive additive, the binder and the solvent is not limited particularly, and for example, it is preferable to compound about 5 to 50 parts by mass of the electrically-conductive additive and about 10 to 50 parts by mass of the binder based on 100 parts by mass of the sulfur-based positive-electrode active material.

[Current Collector]

As for a current collector, those which have been used commonly on positive electrodes for a lithium-ion secondary battery may be used. Examples of a current collector include aluminum foils, aluminum meshes, punched aluminum sheets, aluminum expanded sheets, stainless-steel foils, stainless-steel meshes, punched stainless-steel sheets, stainless-steel expanded sheets, foamed nickel, nickel nonwoven fabrics, copper foils, copper meshes, punched copper sheets, copper expanded sheets, titanium foils, titanium meshes, carbon nonwoven fabrics, carbon woven fabrics and the like.

Among these, a carbon nonwoven fabric current collector and/or a carbon woven fabric current collector, which are composed of carbon with a high graphitization degree, are suitable for a current collector in the case of using the sulfur-based positive-electrode active material as a positive-electrode active material because it does not include hydrogen and has low reactivity to sulfur. As for a raw material for a carbon fiber with a high graphitization degree, there are exemplified various types of pitches (namely, the byproducts of petroleum, coal, coal tar, and so on), polyacrylonitrile fibers (PAN) or the like that are raw materials for carbon fibers.

[Coating Step]

The coating step is a step of mixing the sulfur-based positive-electrode active material, the electrically-conductive additive and the binder and, if necessary, adding a solvent or the like thereto to give a mixture for the electrode layer in a form of slurry, and applying the mixture on the surface of the current collector. Any of coating methods which are generally used for producing an electrode for a lithium-ion secondary battery can be used suitably as a coating method. Examples of such a coating method include a roll coating method, a dip coating method, a doctor blade coating method, a spray coating method, a curtain coating method, and the like.

<Lithium-Ion Secondary Battery>

In an embodiment of the present invention, the lithium-ion secondary battery is one prepared using the above-mentioned positive electrode and can be produced by a usual method using members to be usually used in this field, namely using a negative electrode, an electrolyte, and further a separator as desired in addition to the use of the positive electrode. The shape of the lithium-ion secondary battery is not limited particularly, and the lithium-ion secondary battery can be in various shapes such as a cylindrical shape, a laminated layer type, a coin shape and a button shape. The lithium-ion secondary battery has a large charging and discharging capacity and is excellent in cyclability.

[Negative Electrode]

Examples of a negative electrode material include known metallic lithium, carbon-based materials such as graphite, silicon-based materials such as a silicon thin film, alloy-based materials such as copper-tin or cobalt-tin and the like. Among the above-mentioned negative electrode materials, in the case where a carbon-based material, a silicon-based material, an alloy-based material or the like that does not include lithium is used, it is advantageous from a point that short-circuiting between positive and negative electrodes, which results from production of dendrite, is less likely to arise.

However, in the case where the negative electrode material that does not include lithium is used in combination with the positive electrode of an embodiment of the present invention, neither the positive electrode nor the negative electrode includes lithium and thus a pre-doping treatment, in which lithium is inserted into either one of the negative electrode or positive electrode, or into both of them, becomes necessary. For a method of lithium pre-doping, a publicly known method can be used. For example, in the case where a negative electrode is doped with lithium, the following methods of inserting lithium can be given: an electrolytically-doping method, in which a half-cell is assembled using metallic lithium as the counter electrode and then doping lithium electrochemically; and an application pre-doping method, in which doping is done by a diffusion of lithium onto an electrode by applying a metallic lithium foil onto the electrode and then leaving the electrode with the metallic lithium foil applied in an electrolytic solution. Moreover, in another case as well where the positive electrode is pre-doped with lithium, it is possible to utilize the aforementioned electrolytically-doping method.

Silicon-based materials, which are high capacity negative electrode materials, are preferred as a negative electrode material that does not include lithium. Among them, a silicon thin film that can make a thickness of the electrode thinner and is advantageous in capacity per volume is particularly preferable.

[Electrolyte]

As for an electrolyte to be used on the lithium-ion secondary battery, it is possible to use those in which an alkali-metal salt serving as an electrolyte is dissolved in an organic solvent. Examples of a preferred organic solvent include at least one selected from nonaqueous solvents, such as ethylene carbonate, propylene carbonate, dimethyl carbonate, diethyl carbonate, ethyl methyl carbonate, dimethyl ether, γ-butyrolactone, and acetonirile. Examples of a usable electrolyte include $LiPF_6$, $LiBF_4$, $LiAsF_6$, $LiCF_3SO_3$, LiI, $LiClO_4$ and the like. A concentration of the electrolyte can be from about 0.5 mol/liter to 1.7 mol/liter. It is noted that the electrolyte is not limited to a liquid form. For example, in the case where the lithium-ion secondary battery is a lithium polymer secondary battery, the electrolyte is a solid form (for example, a form of polymer gel).

[Separator]

A separator intervenes between the positive electrode and the negative electrode, thereby not only allowing the movements of ions between the positive electrode and the negative electrode but also functioning to prevent the positive electrode and the negative electrode from internally short-circuiting one another. When the lithium-ion secondary battery is a hermetically-closed type, a function of retaining the electrolytic solution is required for the separator. As for a separator, it is preferable to use a thin-thickness and microporous or nonwoven-shaped film that is made of a material, such as polyethylene, polypropylene, polyacrylonitrile, aramid, polyimide, cellulose, glass and the like.

[Shape of Battery]

The shape of the thus obtained lithium-ion secondary battery is not limited particularly, and the lithium-ion secondary battery can be in various shapes such as a cylindrical shape, a laminated layer type and a coin shape.

EXAMPLE

<Materials Used for Test>
Polymer 1: High-cis butadiene rubber (BR150L available from Ube Industries, Ltd.; cis-1,4 bond content=98% by mass. The cis-1,4 bond content in the butadiene rubber is an amount (% by mass) of cis-1,4 bond unit in the whole butadiene rubber and can be obtained by 13C-NMR spectrum)

Polymer 2: Condensate of octylphenol and sulfur chloride ("Tackirol V200" available from Taoka Chemical Co., Ltd.)

Sulfur: Precipitated sulfur available from Tsurumi Chemical Industry Co., Ltd.

Electrically conductive carbon material: Acetylene black (Denka Black available from Denki Kagaku Kogyo Kabushiki Kaisha) Vulcanization accelerator: NOCCELOR TS (tetramethylthiuram monosulfide available from OUCHI SHINKO CHEMICAL INDUSTRIAL CO., LTD.)

Organometallic compound 1: Zinc stearate

Organometallic compound 2: Magnesium stearate

Organometallic compound 3: Sodium ionomer of ethylene-methacrylic acid copolymer (Component unit derived from methacrylic acid=15% by mass)

Organometallic compound 4: Ferrocene

Organometallic compound 5: Tellurium diethyldithiocarbamate

Example 1

<Positive-Electrode Active Material>

[Preparation of Starting Material]

Materials of Example 1 were subjected to kneading for 20 minutes in accordance with a formulation shown in Table 1 using a kneader (a kneading testing device, MIX-LABO manufactured by Moriyama Company, Ltd.) to obtain a starting material for heat-treatment. The thus obtained starting material was cut into pieces of not more than 3 mm using scissors before the heat-treatment.

[Reaction Apparatus]

A reaction apparatus 1 as illustrated in FIG. 1 was used for the heat treatment. The reaction apparatus 1 comprises a reaction container 3, which has an outer diameter of 60 mm, an inner diameter of 50 mm and a height of 300 mm and is made of quartz glass, that is formed as a bottomed cylindrical shape to contain and heat-treat the starting material 2; a silicone plug 4 for closing an upper opening of the reaction container 3; one alumina protection tube 5 ("Alumina SSA-S" available from NIKKATO CORPORATION, an outer diameter of 4 mm, an inner diameter of 2 mm and a length of 250 mm) and two tubes, which are a gas introducing tube 6 and a gas exhausting tube 7 (both are "Alumina SSA-S" available from NIKKATO CORPORATION, an outer diameter of 6 mm, an inner diameter of 4 mm and a length of 150 mm), these three tubes penetrating through the plug 4; and an electric furnace 8 (crucible furnace, width of an opening: 80 mm dia., heating height: 100 mm) for heating the reaction container 3 from the bottom side.

The alumina protection tube 5 is formed in such a length that the lower part thereof reaches the starting material 2 contained in the bottom of the reaction container 3 from the plug 4 and a thermocouple 9 is inserted through the inside of the alumina protection tube 5. The alumina protection tube 5 is used as a protective tube for the thermocouple 9. The leading end of the thermocouple 9 is inserted into the starting material 2 while being protected by the closed leading end of the alumina protection tube 5 and functions to measure a temperature of the starting material 2. The output of the thermocouple 9 is input in a temperature controller 10 of the electric furnace 8 as shown by the solid arrow in the drawing and the temperature controller 10 functions to control a heating temperature of the electric furnace 8 based on the input from the thermocouple 9.

The gas introducing tube 6 and the gas exhausting tube 7 are formed such that the bottom end thereof projects in 3 mm downwardly from the plug 4. Also, the upper part of the reaction container 3 projects from the electric furnace 8 to be exposed to atmosphere. Therefore, steam of sulfur generating from the starting material due to heating of the reaction container 3 is raised to the upper part of the reaction container 3 as shown by the long dashed short dashed line arrow in the drawing, and transformed to a liquid drop while being cooled to be dropped and refluxed as shown by the broken line arrow in the drawing. Consequently, sulfur in the reaction system does not leak to the outside through the gas exhausting tube 7.

The gas introducing tube 6 is continuously supplied with Ar gas from a gas supply system which is not shown. The gas exhausting tube 7 is connected to a trapping bath 12 containing an aqueous solution 11 of sodium hydroxide. The exhaust gas moving toward the outside through the gas exhausting tube 7 from the reaction container 3 is released to the outside after passing through the aqueous solution 11 of sodium hydroxide in the trapping bath 12. Therefore, even if hydrogen sulfide gas generated from a vulcanization reaction is included in the exhaust gas, the hydrogen sulfide gas is removed therefrom by being neutralized with the aqueous solution of sodium hydroxide.

[Heat Treatment Step]

Heating with the electric furnace 8 was started 30 minutes after starting a continuous supply of Ar (argon) gas to the reaction container 3 holding the starting material 2 in its bottom at a flow rate of 80 ml/min from the gas supply system. The temperature elevation rate was 5° C./min. Since generation of gas was started when the temperature of the starting material became 200° C., the heating was continued while adjusting the flow rate of the Ar gas such that the flow rate of the exhaust gas became as constant as possible. When the temperature of the starting material 2 reached 450° C., heat treatment was conducted for two hours while maintaining the temperature of 450° C. (ultimate temperature). Then, a reaction product was cooled naturally under an Ar gas atmosphere to 25° C. while adjusting the flow rate of the Ar gas and the reaction product was taken out of the reaction container 3.

[Removal of Unreacted Sulfur]

In order to remove the unreacted sulfur (free elemental sulfur) remaining in the product after the heat treatment step, the following step was carried out. Namely, the reaction product was pulverized in a mortar and 2 g of a pulverized product was put in a glass tube oven and heated for three hours at 250° C. while vacuum suction was conducted to produce a sulfur-based positive-electrode active material of Example 1 in which unreacted sulfur was removed (or only a trace amount of unreacted sulfur was contained). The temperature elevation rate was 10° C./min.

<Positive Electrode>

A mixture of 3 mg of the sulfur-based positive-electrode active material of Example 1, 2.7 mg of acetylene black and 0.3 mg of polytetrafluoroethylene (PTFE) was kneaded in an agate mortar till the mixture turned into a film shape while adding an appropriate amount of hexane to the mixture. Thus, a positive electrode material in a film shape was obtained. Then the entire amount of the positive electrode material was press-fitted, with a pressing machine, onto an aluminum mesh (#100 in mesh roughness) that had been punched out to a circle with 14 mm in diameter, and then the film was dried overnight at 80° C. to obtain a positive electrode of Example 1 for a lithium-ion secondary battery.

<Negative Electrode>

A metallic lithium foil (manufactured by Honjo Metal Co., Ltd. and being in the form of a circle having a diameter of 14 mm and a thickness of 500 μm) was used as a negative electrode.

<Electrolyte>

A nonaqueous electrolyte in which $LiPF_6$ had been dissolved in a mixed solvent of ethylene carbonate and diethyl carbonate was used as an electrolyte. A volume ratio of ethylene carbonate and diethyl carbonate was 1:1. A concentration of $LiPF_6$ in the electrolyte was 1.0 mol/liter.

<Lithium-Ion Secondary Battery>

Using the above positive electrode, negative electrode and electrolyte, a coin-type battery was prepared. Specifically, in a dry room, a separator (Celgard 2400 manufactured by Celgard, a polypropylene microporous film with 25 μm in thickness) and a glass nonwoven filter (GA 100 available from ADVANTEC, thickness: 440 μm) were sandwiched between the positive electrode and the negative electrode to form an electrode-assembly battery. Then, the formed electrode-assembly battery was accommodated in a battery case (e.g., a member for CR2032-type coin battery, a product of HOSEN Co., Ltd.) made of a stainless-steel container and the electrolyte solution was added thereto. After that, the battery case was sealed hermetically with a crimping machine, thereby obtaining a lithium-ion secondary battery of Example 1.

Example 2

A sulfur-based positive-electrode active material, a positive electrode and a lithium-ion secondary battery of Example 2 were prepared in the same manner as in Example 1 except that Polymer 1 was changed to Polymer 2.

Example 3

A sulfur-based positive-electrode active material, a positive electrode and a lithium-ion secondary battery of Example 3 were prepared in the same manner as in Example 1 except that Organometallic Compound 1 was changed to Organometallic Compound 2.

Example 4

A sulfur-based positive-electrode active material, a positive electrode and a lithium-ion secondary battery of Example 4 were prepared in the same manner as in Example 1 except that Organometallic Compound 1 was changed to Organometallic Compound 3.

Example 5

A sulfur-based positive-electrode active material, a positive electrode and a lithium-ion secondary battery of Example 5 were prepared in the same manner as in Example 1 except that Organometallic Compound 1 was changed to Organometallic Compound 4.

Example 6

A sulfur-based positive-electrode active material, a positive electrode and a lithium-ion secondary battery of Example 6 were prepared in the same manner as in Example 1 except that Organometallic Compound 1 was changed to Organometallic Compound 5.

Comparative Example 1

A sulfur-based positive-electrode active material, a positive electrode and a lithium-ion secondary battery of Comparative Example 1 were prepared in the same manner as in Example 1 except that Organometallic Compound 1 was not used.

Comparative Example 2

A sulfur-based positive-electrode active material, a positive electrode and a lithium-ion secondary battery of Comparative Example 2 were prepared in the same manner as in Example 1 except that in the step of heat-treating the starting material for the sulfur-based positive electrode active material, an ultimate temperature thereof was changed to 200° C.

Comparative Example 3

A sulfur-based positive-electrode active material, a positive electrode and a lithium-ion secondary battery of Comparative Example 3 were prepared in the same manner as in Example 1 except that in the step of heat-treating the starting material for the sulfur-based positive electrode active material, an ultimate temperature thereof was changed to 600° C.

<Analysis of Sulfur-Based Positive-Electrode Active Material>

(Elemental Analysis for Carbon, Hydrogen, Nitrogen and Sulfur)

As for carbon, hydrogen and nitrogen, a mass ratio (%) based on a total amount of a sulfur-based positive-electrode active material was calculated from a mass amount measured with a full automatic elemental analysis device vario MICRO cube manufactured by Elementar Analysensysteme GmbH. As for sulfur, a mass ratio (%) based on a total amount of a sulfur-based positive-electrode active material was calculated from a mass amount measured with an ion chromatograph device DX-320 manufactured by Dionex Corporation using a column (IonPac AS12A) manufactured by the same Corporation (Metal Component Ratio)

As for metal, a mass ratio (%) thereof based on a total amount of a sulfur-based positive-electrode active material was calculated with TGA (calorimeter) Q500 manufactured by TA Instruments. A mass ratio of a metal component being present in the sulfur-based positive-electrode active material varies with the number of moles of an organometallic compound to be added.

(Observation of Dispersion of Metal)

Figure 2:
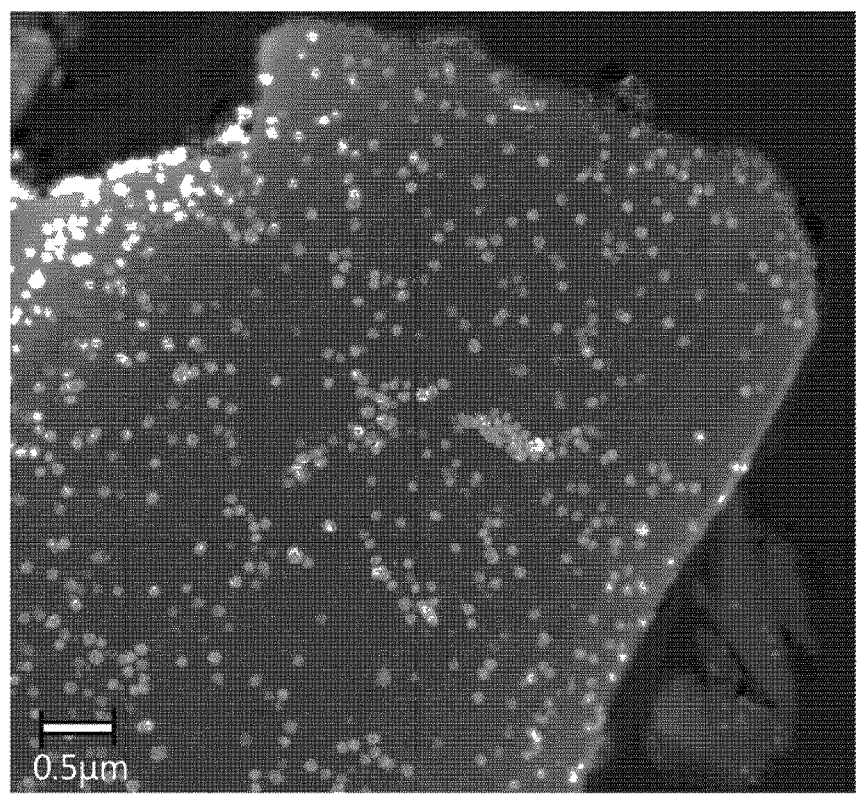
FIG. 2 is a photograph of a transmission electron microscope showing a cross-section of the sulfur-based positive-electrode active material in Example 1.

A state of dispersion of a metal in a sulfur-based positive-electrode active material was observed with H7000 (transmission electron microscope) manufactured by Hitachi, Ltd. From the results of observation in Example 1 with the transmission electron microscope as shown in FIG. 2, it is seen that fine metal particles are dispersed substantially uniformly in the sulfur-based positive-electrode active material.

<Measurement of Charging and Discharging Capacity and Capacity Retention Rate>

With respect to each of the coin-type lithium-ion secondary batteries prepared in Examples and Comparative Examples, charging and discharging were carried out at an electric-current value equivalent to 33.3 mA per 1 g of the positive-electrode active material under a condition of a test temperature of 30° C. The discharge termination voltage was 1.0 V and the charging termination voltage was 3.0 V. Each discharging capacity (mAh/g) was measured.

A discharging capacity (mAh/g) at the second discharging was regarded as an initial capacity. The larger the initial capacity is, the larger the charging and discharging capacity of the lithium-ion secondary battery is, which is evaluated as preferable. Moreover, from a discharging capacity $DC_{10}$ (mAh/g) at the tenth discharging and a discharging capacity $DC_{20}$ (mAh/g) at the twentieth discharging, a capacity retention rate (%) was calculated by the formula (a).

Capacity retention rate (%)=($DC_{20}$(mAh/g)/$DC_{10}$ (mAh/g))×100 (a)

As explained above, it can be said that the higher the capacity retention rate is, the more excellent cyclability of the lithium-ion secondary battery is.

Figure 3:
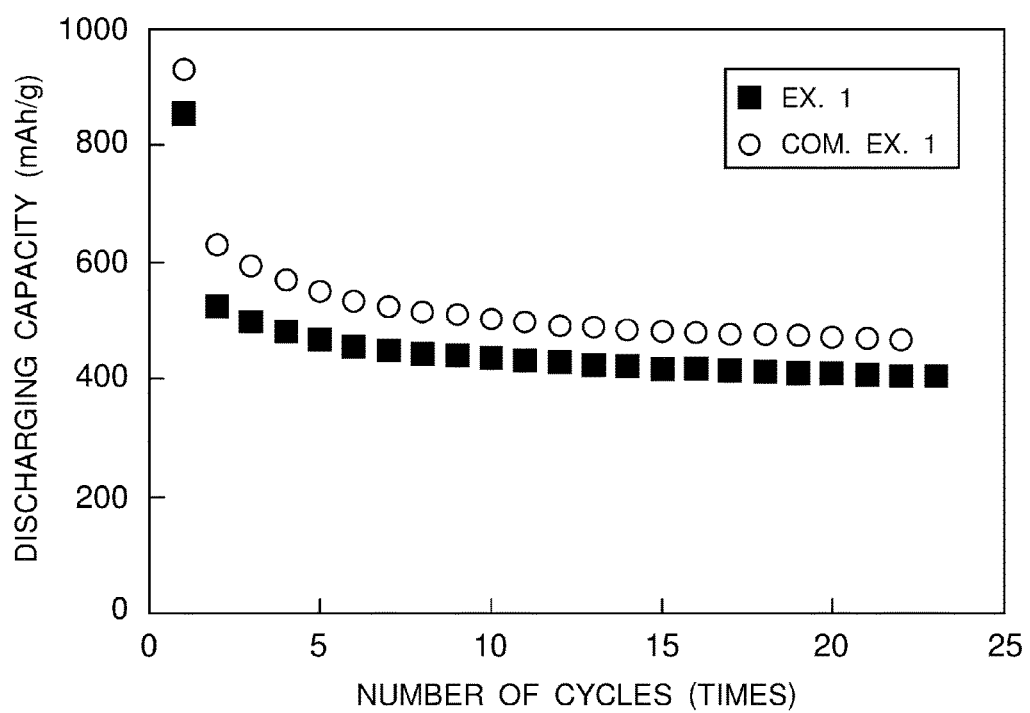
FIG. 3 is a graph showing results of cyclic charging and discharging in Example 1 and Comparative Example 1.

The above-mentioned results are shown in Table 1. Further, a variation of capacities in the cyclic charging and discharging of Example 1 and Comparative Example 1 is shown in FIG. 3.

TABLE 1

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Positive electrode active material Formulation (part by mass) | | | | | | | | | |
| Polymer 1 | 100 | — | 100 | 100 | 100 | 100 | 100 | 100 | 100 |
| Polymer 2 | — | 100 | — | — | — | — | — | — | — |
| Sulfur | 1000 | 1000 | 1000 | 1000 | 1000 | 1000 | 1000 | 1000 | 1000 |
| Electrically conductive carbon material | 20 | 20 | 20 | 20 | 20 | 20 | 20 | 20 | 20 |
| Vulcanization accelerator | 25 | 25 | 25 | 25 | 25 | 25 | 25 | 25 | 25 |
| Organometallic compound 1 | 20 | 20 | — | — | — | — | — | 20 | 20 |
| Organometallic compound 2 | — | — | 20 | — | — | — | — | — | — |
| Organometallic compound 3 | — | — | — | 20 | — | — | — | — | — |
| Organometallic compound 4 | — | — | — | — | 20 | — | — | — | — |
| Organometallic compound 5 | — | — | — | — | — | 20 | — | — | — |
| Ultimate heat-treating temperature (° C.) | 450 | 450 | 450 | 450 | 450 | 450 | 450 | 200 | 600 |
| Elemental analysis (%) | | | | | | | | | |
| C | 41.4 | 42.1 | 41.8 | 46.3 | 40.9 | 42.8 | 44.1 | 56.6 | 64.4 |
| H | 0.2 | 0.1 | 0.2 | 0.2 | 0.1 | 0.0 | 0.2 | 2.3 | 0.1 |
| N | 0.1 | 0.1 | 0.1 | 0.1 | 0.1 | 0.2 | 0.1 | 0.1 | 0.1 |
| S | 56.9 | 54.8 | 56.1 | 53.1 | 55.2 | 56.4 | 55.2 | 39.1 | 32.1 |
| Metal component ratio (%) | 4.5 | 4.8 | 4.8 | 1.8 | 5.6 | 3.8 | 0.1 | 5.6 | 3.9 |

TABLE 1-continued

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Evaluation of battery Discharging capacity (mAh/g) | | | | | | | | | |
| 1st time | 931 | 871 | 886 | 846 | 911 | 881 | 853 | 106 | 378 |
| 2nd time | 630 | 586 | 592 | 571 | 566 | 601 | 525 | 65 | 216 |
| 10th time | 504 | 468 | 481 | 478 | 477 | 506 | 436 | 48 | 182 |
| 20th time | 472 | 451 | 455 | 457 | 446 | 462 | 410 | 44 | 166 |
| Capacity retention rate (%) | 93.7 | 96.4 | 94.6 | 95.6 | 93.5 | 91.3 | 94.0 | 91.7 | 91.2 |

Capacity retention rate of 90% or more is evaluated as being satisfactory. In Example 1, an initial discharging capacity has been remarkably improved as compared with Comparative Example 1 while the capacity retention rate is nearly the same.

INDUSTRIAL APPLICABILITY

In the present invention, an organometallic compound which is easily obtainable and is inexpensive is used and a starting material comprising the organometallic compound dispersed therein in the form of fine particles is heat-treated in the presence of sulfur. Therefore, a sulfur-based positive-electrode active material in which a metallic sulfide having a predetermined particle size is dispersed is provided. Thus, a positive electrode for a lithium-ion secondary battery comprising the sulfur-based positive-electrode active material and a lithium-ion secondary battery comprising the positive electrode are provided. The thus obtained lithium-ion secondary battery is excellent in cyclability and has a largely improved charging and discharging capacity.

EXPLANATION OF SYMBOLS

1 Reaction apparatus
2 Starting material
3 Reaction container
4 Plug
5 Alumina protection tube
6 Gas introducing tube
7 Gas exhausting tube
8 Electric furnace
9 Thermocouple
10 Temperature controller
11 Aqueous solution of sodium hydroxide
12 Trapping bath

What is claimed is:

1. A sulfur-based positive electrode active material, which is obtainable by subjecting a starting material comprising a polymer, sulfur and an organometallic compound dispersed in a form of fine particles to heat-treatment at a temperature of from 300° C. to 550° C. under a non-oxidizing atmosphere,
wherein
the polymer is at least one selected from an unsaturated chain hydrocarbon monomer and a condensate of a substituted aromatic hydrocarbon and sulfur chloride,
particles of metallic sulfide resulting from sulfurization of the organometallic compound are dispersed in the heat-treated material, and
the metallic sulfide particles have a particle size that is not less than 10 nm and less than 100 nm.

2. The sulfur-based positive electrode active material of claim 1, wherein the metal comprises at least one selected from the group consisting of Period 4 metals, Period 5 metals, alkali metals and alkali-earth metals.

3. The sulfur-based positive electrode active material of claim 1, wherein the metal comprises at least one selected from the group consisting of Na, Mg, Ti, Cr, Fe, Ni, Cu, Zn, Ru, Nb, Sb and Te.

4. The sulfur-based positive electrode active material of claim 1, wherein the metal comprises at least one selected from the group consisting of Na, Mg, Fe, Zn and Te.

5. The sulfur-based positive electrode active material of claim 1, wherein the starting material further comprises a vulcanization accelerator.

6. The sulfur-based positive electrode active material of claim 1, wherein the starting material further comprises an electrically-conductive carbon material.

7. The sulfur-based positive electrode active material of claim 6, wherein the electrically-conductive carbon material is a carbon material having graphite structure.

8. The sulfur-based positive electrode active material of claim 6, wherein the starting material comprises 250 to 1500 parts by mass of the sulfur, 5 to 50 parts by mass of the organometallic compound, 3 to 250 parts by mass of the vulcanization accelerator and 5 to 50 parts by mass of the electrically-conductive carbon material based on 100 parts by mass of the polymer.

9. The sulfur-based positive electrode active material of claim 1, wherein a total content of the sulfur in the sulfur-based positive-electrode active material is not less than 50% by mass.

10. The sulfur-based positive electrode active material of claim 1, wherein the condensate of a substituted aromatic hydrocarbon and sulfur chloride is an alkylphenol-sulfur chloride condensate.

11. The sulfur-based positive electrode active material of claim 10, wherein the alkylphenol-sulfur chloride condensate is a compound represented by the following formula (2):

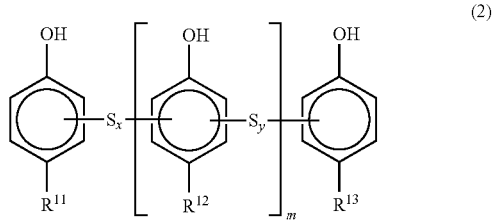

wherein $R^{11}$, $R^{12}$ and $R^{13}$ are the same or different, and each is an alkyl group having 5 to 12 carbon atoms; x and y are the same or different, and each represents an integer of from 1 to 3;

and m represents an integer of from 0 to 250.

12. The sulfur-based positive electrode active material of claim 1, wherein the unsaturated chain hydrocarbon monomer is a diene rubber.

13. A positive electrode comprising the sulfur-based positive electrode active material of claim 1.

14. A lithium-ion secondary battery comprising the positive electrode of claim 13.

15. A process for preparing the sulfur-based positive electrode active material of claim 1, comprising the following steps (1) and (2):

(1) a step of dispersing an organometallic compound in a form of fine particles into a source material comprising a polymer and sulfur to obtain a starting material, wherein the polymer is at least one selected from an unsaturated chain hydrocarbon monomer and a condensate of a substituted aromatic hydrocarbon and sulfur chloride and (2) a step of heat-treating at a temperature of from 300° C. to 550° C. the starting material obtained in the step (1) under a non-oxidizing atmosphere, wherein particles of metallic sulfide resulting from sulfurization of the organometallic compound are dispersed in the heat-treated material and the metallic sulfide particles have a particle size that is not less than 10 nm and less than 100 nm, to produce the sulfur-based positive electrode active material.

* * * * *